United States Patent
Silvanus et al.

(10) Patent No.: US 10,456,985 B2
(45) Date of Patent: Oct. 29, 2019

(54) FRICTION STIR WELDING OF THERMOPLASTICS

(71) Applicant: AIRBUS DEFENCE AND SPACE GMBH, Ottobrunn (DE)

(72) Inventors: Juergen Silvanus, Unterhaching (DE); Heiko Fietzek, Bernau am Chiemsee (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 392 days.

(21) Appl. No.: 15/140,693

(22) Filed: Apr. 28, 2016

(65) Prior Publication Data

US 2016/0318239 A1    Nov. 3, 2016

(30) Foreign Application Priority Data

Apr. 29, 2015   (DE) .................. 10 2015 005 407

(51) Int. Cl.
*B32B 37/00* (2006.01)
*B29C 65/06* (2006.01)
(Continued)

(52) U.S. Cl.
CPC .......... *B29C 65/069* (2013.01); *B23K 20/122* (2013.01); *B23K 20/1245* (2013.01); *B23K 20/22* (2013.01); *B29C 65/0681* (2013.01); *B29C 65/3476* (2013.01); *B29C 66/0042* (2013.01); *B29C 66/1122* (2013.01); *B29C 66/1142* (2013.01); *B29C 66/43* (2013.01); *B29C 66/54* (2013.01); *B29C 66/721* (2013.01);
(Continued)

(58) Field of Classification Search
CPC ............. B29C 65/0681; B29C 65/069; B29C 65/3476; B29C 66/0042; B29C 66/1122; B29C 66/1142; B29C 66/43; B23K 20/122; B23K 20/1245; B23K 20/22
USPC ........................................ 156/73.5
See application file for complete search history.

(56) References Cited

U.S. PATENT DOCUMENTS 5,697,544 A * 12/1997 Wykes ................ B23K 20/125
                                                   156/580
5,718,366 A    2/1998  Colligan
(Continued)

FOREIGN PATENT DOCUMENTS

DE  10 2007 046 478 A1   11/2008
EP     1 941 987 A1       7/2008
(Continued)

OTHER PUBLICATIONS

German Office Action for Application No. 10 2015 005 407.4 dated Jan. 12, 2016.
(Continued)

*Primary Examiner* — James D Sells
(74) *Attorney, Agent, or Firm* — Jenkins, Wilson, Taylor & Hunt, P.A.

(57) ABSTRACT

A method for manufacturing components includes joining a first edge of a thermoplastic-containing first component part and a second edge of a thermoplastic-containing second component part to one another without any overlap. The first and the second edge are interconnected by friction stir welding. Friction stir welding involves rubbing a rotating friction stir welding pin against at least one metal object.

15 Claims, 2 Drawing Sheets

(51) Int. Cl.
*B29C 65/00* (2006.01)
*B23K 20/12* (2006.01)
*B23K 20/22* (2006.01)
*B29C 65/34* (2006.01)
*B64F 5/10* (2017.01)
*B23K 103/00* (2006.01)
*B23K 103/16* (2006.01)
*B29K 705/02* (2006.01)
*B29K 705/00* (2006.01)
*B29K 105/20* (2006.01)
*B29L 31/30* (2006.01)
*B29K 701/12* (2006.01)
*B64C 1/00* (2006.01)

(52) U.S. Cl.
CPC .. *B29C 66/72321* (2013.01); *B29C 66/73113* (2013.01); *B29C 66/73921* (2013.01); *B29C 66/8122* (2013.01); *B29C 66/81429* (2013.01); *B29C 66/836* (2013.01); *B64F 5/10* (2017.01); *B23K 2103/172* (2018.08); *B23K 2103/42* (2018.08); *B29C 66/005* (2013.01); *B29C 66/7212* (2013.01); *B29K 2105/20* (2013.01); *B29K 2701/12* (2013.01); *B29K 2705/00* (2013.01); *B29K 2705/02* (2013.01); *B29L 2031/3082* (2013.01); *B64C 2001/0054* (2013.01)

(56) References Cited

U.S. PATENT DOCUMENTS

| | | | |
|---|---|---|---|
| 6,866,181 B2* | 3/2005 | Aota | B23K 20/1255 219/50 |
| 7,507,309 B2* | 3/2009 | Manicke | B23K 20/122 156/73.5 |
| 7,879,421 B2 | 2/2011 | Manicke et al. | |
| 2008/0023524 A1* | 1/2008 | Ohashi | B23K 20/1245 228/2.1 |
| 2008/0099533 A1 | 5/2008 | Hanlon et al. | |
| 2009/0098369 A1 | 4/2009 | Manicke et al. | |
| 2014/0326392 A1* | 11/2014 | Silvanus | B23K 20/1255 156/73.5 |

FOREIGN PATENT DOCUMENTS

EP 2 540 476 A1 1/2013
JP 2003-145625 A 5/2003

OTHER PUBLICATIONS

Extended European Search Report for Application No. 16162565.2 dated Sep. 23, 2016.

\* cited by examiner

FRICTION STIR WELDING OF THERMOPLASTICS

CROSS-REFERENCE TO RELATED APPLICATION

This application claims priority to DE 10 2015 005 407.4 filed Apr. 29, 2015, the entire disclosure of which is incorporated by reference herein.

TECHNICAL FIELD

The disclosure herein relates to a method for manufacturing components and to a device for connecting thermoplastic elements.

BACKGROUND

To manufacture components, it is often necessary to rigidly interconnect two or more component parts. If the material of the component parts is suitable, the friction stir welding technique may in particular be used; in this process, component parts are positioned on a base plate without any overlap. By a rotating pin, enough frictional heat is then generated in a joint region for the components to fuse together at this point.

The method is particularly suitable for component parts that have a relatively low melting point and good thermal conductivity. In particular, the method is suitable for connecting components made of light metal, such as aluminium or aluminium alloys.

However, using the method to connect plastics components, for example thermoplastic components, is problematic, in particular owing to the low thermal conductivity thereof. In order to still cause the material in the joint region to melt, the friction stir welding tool (in particular the pin thereof) and/or thermoplastic parts to be joined are heated by a separate heat source.

For this purpose, induction heaters, infrared heaters, laser devices and/or heating plates or heating wires can be used.

However, incorporating additional heat sources of this type results in the method becoming more complex than a standard friction stir welding process. Furthermore, the additional heaters increase the complexity and the fault susceptibility of the machinery, and thus in particular increase the machinery and maintenance costs.

SUMMARY

The problem addressed by the present disclosure is that of overcoming the above-mentioned drawbacks of friction stir welding thermoplastics.

A method according to the disclosure herein for manufacturing components comprises joining (i.e. butt-joining) a first edge of a thermoplastic-containing first component part and a second edge of a thermoplastic-containing second component part to one another without any overlap; the component parts may for example be planar, flat or curved structural elements.

According to the method according to the disclosure herein, the first and the second component parts are interconnected by friction stir welding after having been joined to one another at their edges. Friction stir welding involves rubbing a rotating friction stir welding pin against at least one metal object.

A metal object of this type may in particular be incorporated into the first and/or second component part, for example in the form of one or more fibers, wires, fragments, balls and/or other bodies. Alternatively or additionally, a metal object of this type may form an inner or outer ply of a multi-layered arrangement in the first or second component part in the form of a foil or a metal sheet. In particular, the first component part or both component parts may contain a composite material which comprises thermoplastic material and the metal object(s).

Alternatively or additionally, the metal object (or one of the metal objects) may be contained in a base plate, on which the first and the second component part are joined to one another so as to rest thereon (e.g. lie thereon). In this case, the metal object may extend along all or part of the first edge (and the second edge joined thereto). In particular, the metal object may be planar, for example may itself form the base plate.

The rubbing may in particular take place by bringing the metal object into contact with a portion of the lateral surface of the friction stir welding pin (i.e. a side face of the cylindrical friction stir welding pin extending around the rotational axis) during rotation of the pin. Alternatively or additionally, the rubbing may be brought about by bringing the metal object into contact with the tip of the rotating friction stir welding pin.

In accordance with the method according to the disclosure herein, frictional heat is not only generated by bringing the rotating friction stir welding pin into contact with thermoplastic material, but also by rubbing the friction stir welding pin against the metal object. The coefficient of friction between the metal object and the friction stir welding pin is greater than the coefficient of friction between the friction stir welding pin and thermoplastic material in this case. Additional frictional heat is generated thereby, which spreads out owing to the good thermal conductivity of the metal in the metal object and in the friction stir welding pin. As a result, the surrounding and/or adjacent thermoplastic material is heated further and can thus be brought to a flow temperature without an additional heat source.

This principle also forms the basis for a device according to the disclosure herein for connecting thermoplastic-containing component parts by friction stir welding: a device of this type comprises a base plate having at least one metal portion, the base plate being designed to be in contact with joined component parts that are to be connected; in particular, the base plate may be designed to act as a support for joined component parts that are to be connected.

The device further comprises a rotatable friction stir welding pin which comprises a tip and is designed to rub against the metal portion of the base plate by its tip during friction stir welding.

The metal portion may for example be a strip incorporated into a base plate or a planar portion of the base plate, or may be the entire base plate. It may be made of steel or iron, for example.

A method according to the disclosure herein and a device according to the disclosure herein thus make it possible to butt-weld thermoplastic-containing components to one another without an additional heat source being involved. In comparison with other materials, thermoplastic-containing components of this type are easy to shape and have a low density, which is why they are advantageous for many uses (for example in the field of transport construction, in particular aircraft construction). The fact that the present disclosure makes it possible to omit an additional heat source results in a welding process that is simpler than conventional friction stir welding of thermoplastics and in the use of more cost-effective, robust and user-friendly systems engineering.

Furthermore, in accordance with the method according to the disclosure herein, the different plies of component parts of this type, in which thermoplastic material and sheet metal or metal foil are laminated, can be synchronously interconnected. This results in an advantage compared with conventional manufacturing of multi-layered components, in which only thin sheet-metal parts are welded to one another, thermoplastic material then being laminated thereon or therebetween: this approach is complex and therefore expensive, and for certain dimensions or shapes it is even impossible, in particular because the large, thin and thus non-dimensionally stable thin metal sheets that result from the welding are difficult to position.

Lastly, metal objects that are potentially contained in the first and second component parts are interconnected using the method according to the disclosure herein. These connections may advantageously act as a way for stabilizing the weld seam.

The first and the second edge can thus be connected using a friction stir welding tool which has not been pre-heated and/or which is not connected to a heat source. In particular, the friction stir welding pin may be at ambient temperature at the start of the connection process.

According to some embodiments, the friction stir welding pin consists of or comprises metal at least in part (for example iron or steel). A metal of this type preferably has a higher melting point than the material or materials of thermoplastic-containing first and/or second component part. Owing to its good thermal conductivity, a friction stir welding pin of this type is suitable for distributing the frictional heat, which is generated by rubbing the pin against the metal object or metal portion, over its lateral surface and thus melting the materials of the adjacent first and second edges. A metal friction stir welding pin of this type may be provided with a coating which may comprise ceramic material, for example.

According to some embodiments of a method according to the disclosure herein, a tip of the friction stir welding pin rubs against the metal object (or against at least one of the metal objects) during friction stir welding. Here, the metal object may be part of a base plate on which the first and the second edge are joined to one another so as to rest thereon.

While, in conventional friction stir welding processes for connecting metals, the tip of the welding tool pin is guided over a base plate at a distance of a few tenths of a millimeter in order to prevent the base plate from fusing to the metal components to be connected, according to the embodiment for the friction stir welding of thermoplastic-containing material, contact between the base plate and the friction stir welding pin is deliberately used to generate frictional heat.

In this process, the melting point of the metal object of the (or in the) base plate may be lower than the melting point of thermoplastic material, and therefore thermoplastic-containing component parts can be prevented from fusing with this metal object, and frictional heat is nevertheless generated in the metal and utilised (as described).

Alternatively or additionally—in order to prevent the metal portion of the base plate from fusing with thermoplastic material—the tip of the friction stir welding pin and/or the metal object (all or part thereof, e.g. along a weld seam to be produced), or even the entire base plate, can be coated with a separation layer. The separation layer may be made of a material that is abrasion-resistant and/or thermally conductive and/or has a higher melting point than thermoplastic material; ceramic material is particularly suitable, for example. As a result, it is possible to detach the component without any losses after connecting the first edge to the second edge using the friction stir welding process.

Some embodiment of a method according to the disclosure herein comprise a step of detaching the interconnected first and second component parts from the base plate.

In particular, a method according to the disclosure herein and a device according to the disclosure herein include embodiments according to which two thermoplastic-containing component parts, which do not contain any metal (e.g. two component parts which only consist of or comprise (optionally glass-reinforced) thermoplastic material), are interconnected using friction stir welding without an additional heat source: the heat required for melting thermoplastic material is (in addition to rubbing the tip against thermoplastic components) generated by rubbing the tip of the rotating friction stir welding pin against the base plate (or the metal object that the plate comprises).

The first and the second component parts may be planar in this case and each have a thickness of at most 10 mm, for example 1 mm to 5 mm. This thickness allows the frictional heat which is generated by the rotating friction stir welding pin rubbing against the base plate (or against the metal portion or metal object that the plate comprises) to advantageously spread out in the component parts.

According to some embodiments of the present disclosure, the first component part comprises a welding surface (i.e. a surface which, according to the method, is connected to a welding surface of the second edge (of the second component part)), of which 10% to 40%, for example 20% to 30%, is formed by one or more surfaces of the at least one metal object. These surface percentages ensure a particularly good ratio between thermoplastic material to be fused and the metal generating frictional heat, by which ratio sufficient heat for connecting the two component parts is thus generated, and also the energy consumption is kept as low as possible.

Some embodiments of a method according to the disclosure herein comprise—before the edges are joined to one another without any overlap—inserting the at least one metal object into thermoplastic-containing first component part on the first edge thereof. In this process, thermoplastic material may be in a heated, soft state. Alternatively, the method may comprise driving the at least one metal object into thermoplastic-containing first and/or second component part in a solid state, for example by pressing in or boring in the metal object (or metal objects) in the form of pins, spikes, points or strips, preferably from a welding surface on the first edge.

Alternatively or additionally, the method may comprise applying the at least one metal object in the form of a metal layer to thermoplastic-containing first and/or second component part.

In this way, the first and the second thermoplastic-containing component part may only be equipped with the metal object(s) that is/are advantageous for welding according to the disclosure herein after they have been manufactured.

According to some embodiments, the metal object or at least one of the metal objects comprises a light metal, such as aluminium and/or an aluminium alloy. This material has particularly good thermal conductivity. Furthermore, compared with other metals, aluminium has a particularly low density, and therefore components having a relatively low weight can be manufactured.

According to some variants of a method according to the disclosure herein, thermoplastic-containing first and/or second component part is free of metal at a distance of 2 cm, for example at a distance of 1 cm, or for example at a distance of 0.5 cm, from the first edge and the second edge, respectively. In this case, thermoplastic-containing first and/or second component part thus comprises metal only in a peripheral region on the first and second edge, respectively, while it otherwise consists of or comprises one or more other materials, for example solely of thermoplastic material. Although the use of the metal in the region of the edges can thus be used to generate frictional heat and can thus be used for an advantageous welding process as described above, possible disadvantageous effects of the metal (which may result from the electrical conductivity or the weight of the metal, depending on the intended use of the component to be manufactured) can be minimised or even avoided by excluding the metal in regions remote from the edges.

According to some embodiments of the present disclosure, a method according to the disclosure herein is used for manufacturing a shell element for the fuselage region of an aircraft and/or of a freight container, for example an airfreight container. In this way, a large shell element of this type or a large freight container of this type can be manufactured in a simple manner from a thermoplastic-containing and thus light and easily shapeable material, while avoiding the need for an additional heat source during welding.

BRIEF DESCRIPTION OF THE DRAWINGS

In the following, some embodiments of the disclosure herein are described in greater detail with reference to drawings. It is clear that individual elements and components can also be combined in manners different to those shown.

In the schematic drawings.

DETAILED DESCRIPTION

Figure 1A:
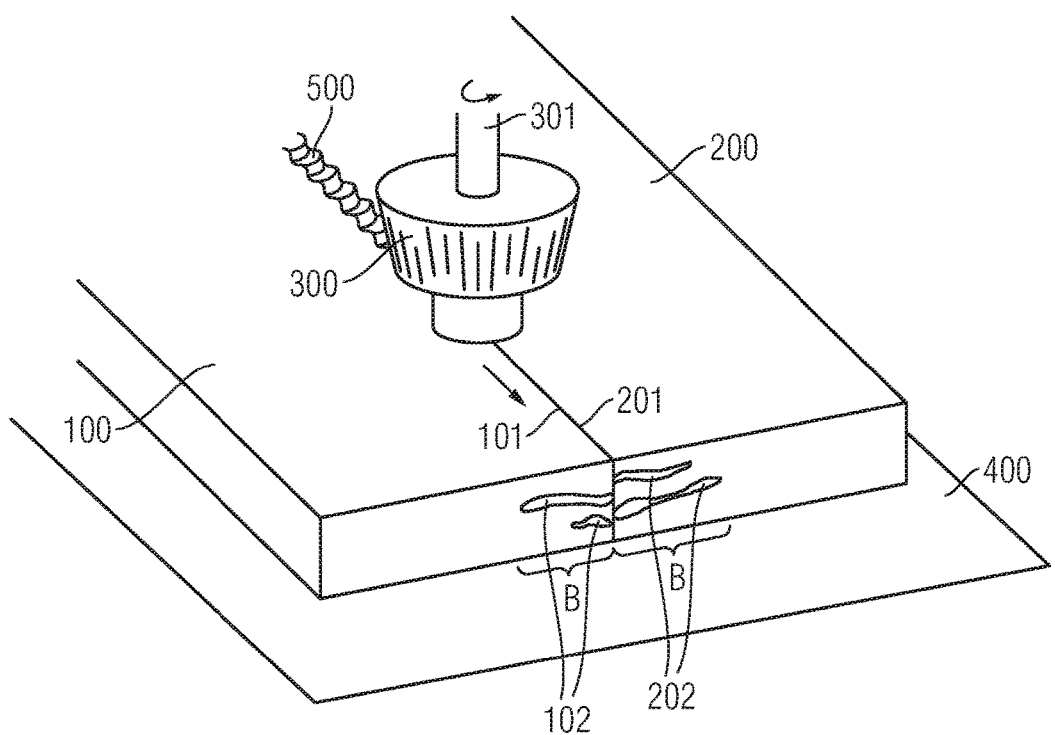
FIG. 1A a shows an implementation of a method according to the disclosure herein in accordance with an exemplary embodiment.

FIG. 1A is a schematic perspective view of an arrangement during manufacture of a component according to an embodiment of a method according to the disclosure herein. The arrangement comprises a first component part 100 having a first edge 101 which is joined to a second edge 201 of a second component part without any overlap (i.e. butt-joined) on a base plate 400.

In the example shown, the component parts 100, 200 are designed as cuboid planks; it is clear that the present disclosure is not limited to the connection of component parts having this shape. In particular, the component parts may comprise curved, non-linear portions and/or may be different from one another.

The first and the second component part are each made of a thermoplastic-containing material, into which metal objects 102, 202 in the form of metal fibers are incorporated around the edges in a region $B_1$ and $B_2$, respectively. Outside the regions $B_1$ and $B_2$, for example at a distance of 1 cm, more preferably at a distance of 0.5 cm, from the first and the second edge 101, 201, respectively, the first and the second component part are each free of metal.

A friction stir welding device 300 (shown schematically and only in portions in the figure) comprising a rotating friction stir welding pin 301 is guided in the direction of the arrow along the joined edges 101, 201; in the process, the end of the rotating friction stir welding pin 301 closest to the base plate 400 penetrates between the first and the second edge (not visible in the figure), such that its lateral surface rubs against the welding surfaces of the first and second edges that are to be connected, and in particular against the metal objects 102, 202; here, the coefficient of friction between the metal object and the friction stir welding pin is greater than the coefficient of friction between the friction stir welding pin and thermoplastic material in the component parts 100, 200.

As a result, both the metal objects and thermoplastic material surrounding the objects melt at the edges 101, 201, so that the edges run into one another. This produces a welded connection 500 between the first and second component parts 100, 200, without the friction stir welding pin 301 or the component parts 100, 200 being additionally heated.

Figure 1B:
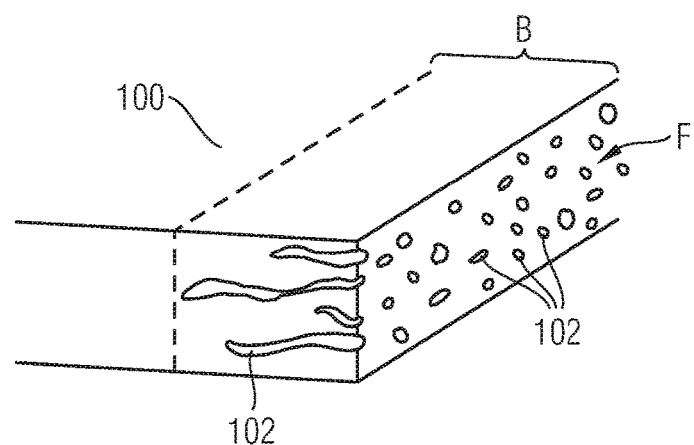
FIG. 1B is a view of a welding surface of an exemplary component part.

FIG. 1B shows a component part 100 corresponding to the first component part 100 from FIG. 1A such that a welding surface F is visible on the edge 101. According to a preferred embodiment, the percentage of the surface formed by the metal objects 102 in the surface F is 10% to 40%, more preferably 20% to 30%.

Figure 2:
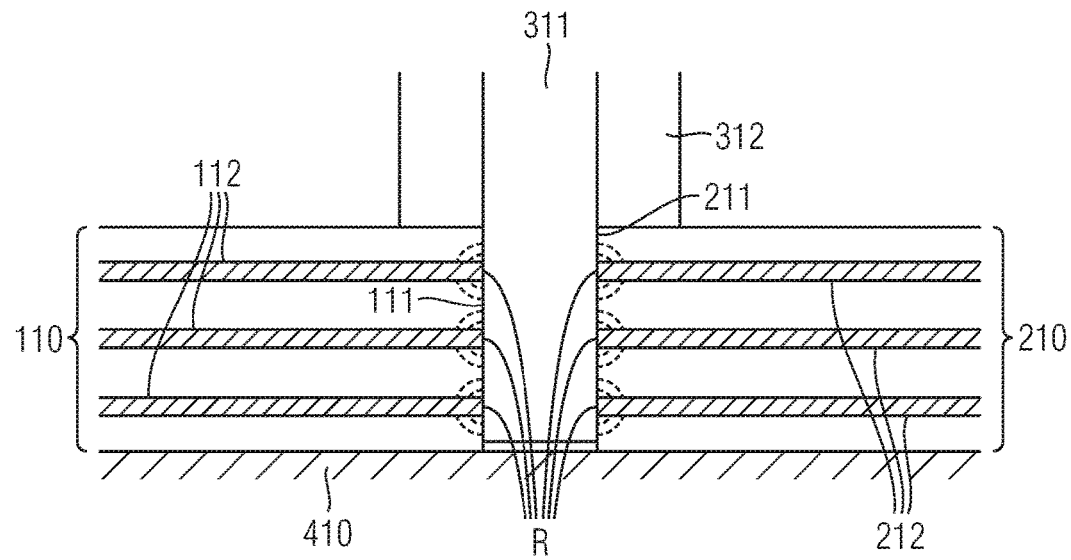
FIG. 2 is a cross section through an exemplary embodiment of the present disclosure.

FIG. 2 is a schematic cross section through an exemplary embodiment of the present disclosure. In this figure, a rotating friction stir welding pin 311 penetrates between a first edge 111 and second edge 211 of a thermoplastic-containing first and second component part 110, 210, which are joined to one another on a base plate 410. The first component part 110 and the second component part 210 each comprise metal objects 112, 212 which are inserted into thermoplastic-containing material in the form of layers; it is clear that, alternatively, there may be more or fewer metal layers than the three example metal layers in the component parts.

In particular, the metal objects may comprise aluminium, for example; according to a preferred variant, the first and/or second component part comprises glass-reinforced aluminium (what is known as "GLARE").

For example, the first and the second edge 111, 211 are interconnected by friction stir welding. In the process, the rotating friction stir welding pin 311 rubs against the metal objects 112, 212, in particular in the rubbing regions denoted by R in the figure. The frictional heat thus generated, which is schematically shown in the figure spreading out in dashed semi-circles, makes it possible to fuse the first edge 111 to the second edge 211 without it being necessary to additionally heat the friction stir welding pin 311 or the component parts 110, 210.

The friction stir welding pin 311 is supported by a shoulder 312, which preferably remains stationary, i.e. does not rotate, so that (almost) no frictional heat is generated in the regions of contact between the shoulder and the first and second component parts. As a result, fusion of material outside the welding surfaces of the edges can be reduced, and thus a neater weld seam can be produced. The tip of the friction stir welding pin is guided over the base plate without contact in the embodiment shown in FIG. 2.

Figure 3:
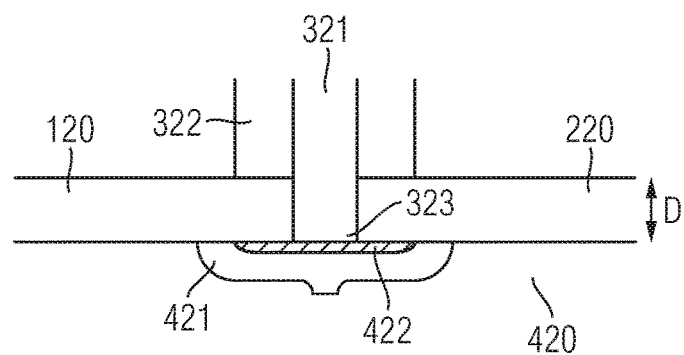
FIG. 3 shows a use of an exemplary embodiment of a device according to the disclosure herein in cross section.

FIG. 3 shows both an implementation of an embodiment of a method according to the disclosure herein and a device according to the disclosure herein in accordance with an exemplary embodiment in use. The device comprises a base plate 420 having a metal portion 421; alternatively, the metal portion could also be the entire base plate. In particular, the metal portion having the reference signs used in this document represents a metal object.

The device further comprises a friction stir welding tool comprising a friction stir welding pin 321 which is held in a shoulder 322; in accordance with that set out above, the shoulder preferably remains stationary during friction stir welding, i.e. does not rotate together with the friction stir welding pin 321.

In the situation shown in FIG. 3, the friction stir welding pin 321 penetrates between a first component part 120 and a second component part 220 joined thereto without any overlap, and specifically to the extent that its tip 323 rubs against the metal portion 421 during friction stir welding. The frictional heat thus generated makes it possible to weld the first component part 120 to the second component part 220. The component parts may in particular be free of (additional) metal objects in this case, for example they may be a pure thermoplastic material or a glass-reinforced thermoplastic material. Preferably, the first and the second component part 120, 220 are planar and have a thickness D of at most 1 cm, preferably of from 1 mm to 5 mm.

In order for it to be easier to detach the component parts that have been welded together, in the embodiment shown the metal portion 421 of the base plate 420 is provided with a separation layer. This layer may in particular comprise a ceramic material. Alternatively or additionally, the tip 323 and/or the lateral surface of the friction stir welding pin 321 could be coated with a separation layer of this type.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

What is claimed is:

1. A method for manufacturing components, the method comprising:
   joining a first edge of a thermoplastic-containing first component part and a second edge of a thermoplastic-containing second component part to one another without any overlap; and
   connecting the first edge and the second edge by friction stir welding, the friction stir welding including rubbing a rotating friction stir welding pin against at least one metal object, wherein the at least one metal object is incorporated into the first and/or the second component part in a form of one or more wires, fragments, balls, a foil and/or a metal sheet,
   wherein, prior to joining, the method comprises driving the metal object into the thermoplastic-containing first and/or second component part, and/or applying the metal object in a form of a metal layer to the thermoplastic-containing first and/or second component part.

2. The method of claim 1, wherein the at least one metal object comprises at least one wire incorporated into the first and/or second component part and/or at least one fiber incorporated into the first and/or second component part.

3. The method of claim 1, wherein the first component part and/or the second component part contains a multi-layered composite material in which the metal object is coated at least in portions with a thermoplastic-containing material.

4. The method of claim 1, wherein, during friction stir welding, a tip of the friction stir welding pin rubs against a base plate having a metal portion and on which the first and the second edge are joined to one another so as to rest thereon.

5. The method of claim 4, wherein the metal portion and/or the friction stir welding pin are coated with a separation layer at least in part.

6. The method of claim 4, further comprising:
   detaching the interconnected first and second component parts from the base plate.

7. The method of claim 1, wherein, on the first edge, the first component part comprises a welding surface of which 10% to 40% is formed by one or more surfaces of the at least one metal object.

8. The method of claim 7, wherein, on the first edge, the first component part comprises a welding surface of which 20% to 30% is formed by one or more surfaces of the at least one metal object.

9. The method of claim 1, wherein the first and/or the second component parts are free of metal at a distance of 1 cm from the first edge and the second edge, respectively.

10. The method of claim 9, wherein the first and/or the second component parts are free of metal at a distance of 0.5 cm from the first edge and the second edge, respectively.

11. The method of claim 1, wherein the components are or comprise shell elements for a fuselage region of aircraft and/or air-freight containers.

12. The method of claim 1, wherein the friction stir welding pin has not been pre-heated before connecting the first and the second edge.

13. The method according to claim 1, wherein one or more fibers as a metal object are incorporated into the first and/or the second component part.

14. A method for manufacturing components, the method comprising:
   joining a first edge of a thermoplastic-containing first component part and a second edge of a thermoplastic-containing second component part to one another without any overlap; and
   connecting the first edge and the second edge by friction stir welding, the friction stir welding including rubbing a rotating friction stir welding pin against at least one metal object, wherein the at least one metal object is incorporated into the first and/or the second component part in a form of one or more wires, fragments, balls, a foil and/or a metal sheet,
   wherein the first component part and/or the second component part contains a multi-layered composite material in which the metal object is coated at least in portions with a thermoplastic-containing material.

15. A method for manufacturing components, the method comprising:
   joining a first edge of a thermoplastic-containing first component part and a second edge of a thermoplastic-containing second component part to one another without any overlap; and
   connecting the first edge and the second edge by friction stir welding, the friction stir welding including rubbing a rotating friction stir welding pin against at least one metal object, wherein the at least one metal object is incorporated into the first and/or the second component part in a form of one or more wires, fragments, balls, a foil and/or a metal sheet,
wherein the first and/or the second component parts are free of metal at a distance of 1 cm from the first edge and the second edge, respectively.

* * * * *